March 30, 1943.    C. W. ROBERTS    2,315,082
CABLE CLAMP
Filed March 16, 1940
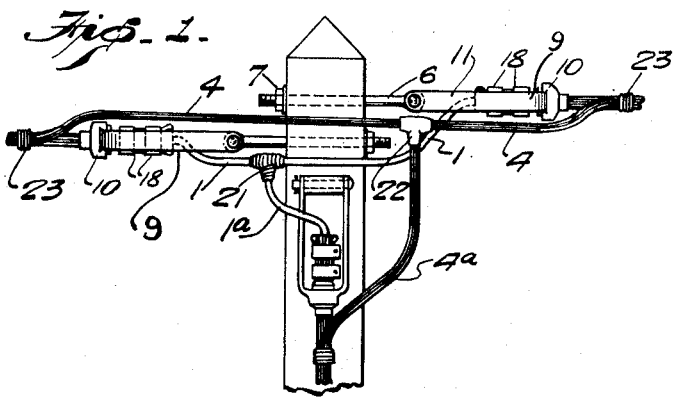
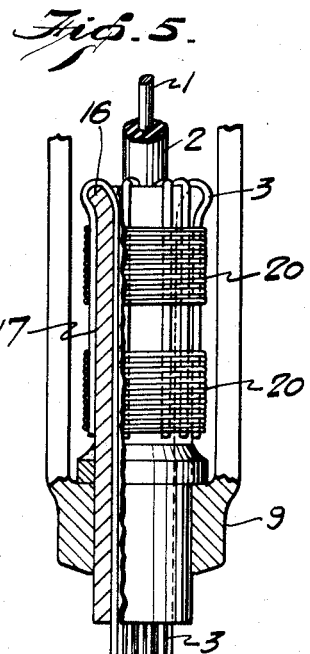
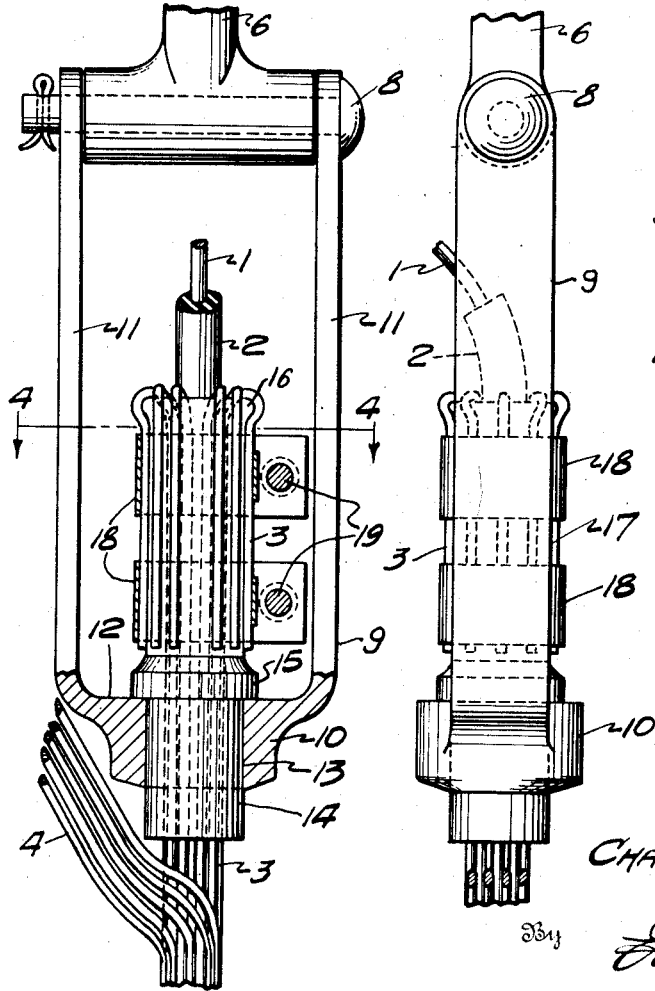
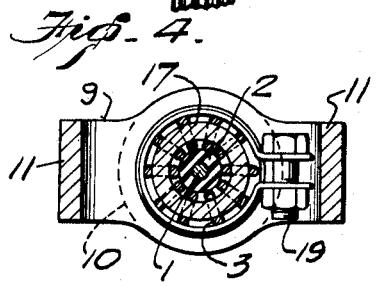
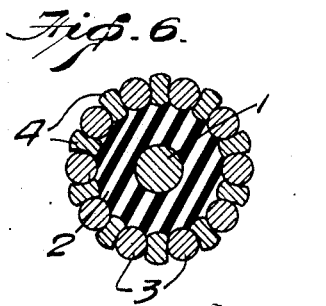
Inventor
CHARLES W. ROBERTS
By Ernest F. Mechlin
his Attorney Patented Mar. 30, 1943

2,315,082

UNITED STATES PATENT OFFICE 2,315,082

CABLE CLAMP

Charles W. Roberts, East Milton, Mass., assignor to Locke Insulator Corporation, Baltimore, Md., a corporation of Maryland Application March 16, 1940, Serial No. 324,428

8 Claims. (Cl. 174—43)

This invention relates, generally, to cable clamps and, more particuarly, to clamps for attaching armored electric cables to a pole or other suitable support in elevated position.

The cables for which the clamp of the present invention is especially designed are of the type in which one or more insulated center conductors carrying current at line potential are enclosed in an outer conductor carrying current usually at ground potential. The outer conductor is intended not only to carry current at ground potential, to prevent injury from accidental contact with the cable, but to sustain the weight of the cable between supports. To enable it to perform these functions the armor is composed of wires alternately of high tensile strength, such as steel, and of good electrical conductivity, such as tinned copper or aluminum.

While such a cable possesses desirable properties, its use introduces certain problems which are not met in the installation of ordinary cables. If the cable were to be attached to supports by ordinary clamps, the long unsupported spans made possible by the high tensile strength of the supporting wires would cause both the armor and the insulation to be crushed, impairing the effectiveness of the insulation. An additional difficulty is confronted in tapping armored cable for branch lines as the armor and insulation must be removed without either transferring the weight of the cable to the relatively weak center conductor or destroying the continuity of current in the outer conductor. While clamps have heretofore been developed for attaching the type of cable here under discussion to a support, none of these clamps are very satisfactory as they are incapable of clamping the cable so as to entirely prevent either injury to or slippage of the cable.

The primary object of the invention is to provide a clamp for an armored cable having an insulated center conductor whereby the cable can be effectively attached to a support without injury to the insulation or strain on the center conductor.

Another object of the invention is to provide a clamp for attaching a cable of the character described to a support which permits the cable to be tapped without transferring from the high tensile strength wires the weight of the cable or breaking the continuity of the conducting wires.

An additional object is to provide a cable clamp of the character described in which the parts of the clamping device are capable of relative rotation so as to prevent the concentration of rotative stress at the juncture of the clamp and cable.

A further object of the invention is to provide a clamp for attaching cables of the character described to supports without slippage, which is of simple construction, inexpensive to manufacture, and easy to install.

These and other objects will hereinafter appear in the detailed description of the accompanying drawing and be particularly pointed out in the appended claims.

In the drawing, illustrating preferred embodiments of the invention:

Figure 1 is an elevational view of the top portion of a supporting pole with a main cable attached thereto and a branch cable tapped into the main cable.

Figure 2 is a plan view on an enlarged scale of one of the clamps of Figure 1 with portions broken away to more clearly show the details of the construction.

Figure 3 is a side view of the clamp of Figure 2.

Figure 4 is a vertical sectional view taken along the lines 4—4 of Figure 2, looking in the direction of the arrows.

Figure 5 is a plan view of a portion of another embodiment of the clamp in which the cable is attached by wire serving.

Figure 6 is an enlarged cross-sectional view of the cable.

Referring now in detail to the drawing and particularly to Figure 6, 1 indicates a center conductor, of which one or more may be provided, each conductor being either solid or stranded in the usual manner. The conductor is enclosed in insulating material 2 of rubber varnished cambric or other organic types of insulation. Surrounding or sheathing the insulation is an outer conductor or armor which is preferably formed of round steel wires 3 of high tensile strength and relatively soft wires 4, originally substantially rectangular in cross-section, of good electrical conductivity, such as tinned copper or aluminum. The wires are alternately arranged and wrapped around the insulation of the center conductor in the long pitch spiral usually employed in cable construction, an illustration of such a cable appearing in Patent No. 2,136,258. The steel wires are spiraled without being twisted to avoid torsional strains which would cause the wires to spread when cut. The copper wires, because of their rectangular cross-section, are twisted in wrapping so that they occupy radial positions, the softness of the wires preventing any tendency to spread. After the wires have been wrapped around the center conductor the cable is drawn through a die where external pressure is applied to reduce it to the desired outside diameter, causing the steel wires to form seats in the side walls of the copper wires and compacting the armor into an annulus about the insulation. By reason of the high tensile strength of the steel wires and the interlocking of the steel and copper wires, the resultant cable is self-sustaining. The cable is also self-insulating, rendering unnecessary its insulation from the supports to which it is attached.

The clamp by which the cable is attached to a pole or other suitable support 5 may be anchored to the post by a T- or cross-headed bolt 6 which extends through the post. The bolt is screw threaded and carries a nut 7. The head of the bolt is pierced and adapted to receive a pin 8 by which the hanger, bail or yoke 9 is adapted to be pivotally secured to the bolt. The U-shaped hanger comprises a base or bottom wall 10 and a pair of spaced substantially parallel arms 11 connected by and extending outwardly from the base. The arms are spaced sufficiently to overlie the opposite ends of the head of the bolt 6 and are apertured adjacent their outer ends to receive the pin 8. The T-head of the bolt serves to maintain the spaced relation between the arms.

Approximately equidistant from the arms, the inner surface 12 of the base of the hanger is interrupted by a cylindrical aperture or opening 13 which extends through and is normal to the base. A ferrule or hollow tubular member 14, preferably cylindrical both externally and internally and of the external diameter required to permit it to be received in and closely engage the walls of the base defining the aperture, is adapted to seat in the aperture and turn or rotate relative to the hanger. Intermediate the ends of the ferrule is a ring, collar or shear lug 15 which may be formed integrally with or subsequently welded or otherwise affixed to the ferrule. When the ferrule and hanger are assembled, the collar abuts the inner surface 12 of the base, limiting the longitudinal movement of the ferrule relative to the hanger and defining the extent to which the ferrule can project into or through the opening or recess 13. To minimize the frictional resistance to rotation of the ferrule, the engaging surfaces of the collar and base are preferably flat. If desired, this friction may be further reduced by the interposition of an anti-friction bearing between the hanger and the ferrule.

The clamp can readily be applied to the cable by first feeding the cable through the aperture 13 in the hanger which is preferably disconnected from the anchor bolt. The ferrule or sleeve is then slipped over the cable until the required length of the latter protrudes from the inner end or lip 16 of the sleeve. At a distance from the end of the ferrule approximately equal to the length of the shank 17, which is that portion of the ferrule included between the collar and its inner end, the steel supporting wires 3 are next cut and bent or doubled back over the ferrule. The supporting wires are secured to the exterior surface of the shank and the hanger is then connected to the bolt anchored to the post. To complete the installation the anchor bolt is drawn up by the nut 7 until the cable is at the desired tension.

In clamping or securing the supporting wires to the ferrule it is essential that the wires be secured so as not to slip when they are subjected to the weight of the cable. Various methods are available for this purpose. In Figure 2 the wires are secured by ordinary clamps 18, contracted by tightening bolts 19, two or more clamps being usually required, although one may sometimes suffice. In the embodiment illustrated in Figure 5 bands of wire serving 20 are utilized. In either case the arms of the hanger are spaced sufficiently to permit the ferrule to rotate freely after the supporting wires are secured to its exterior. Consequently, while the serving is more difficult to apply, an advantage attendant its use is that the arms of the hanger can be spaced at a lesser distance, as shown in Figure 5, increasing the strength and reducing the weight of the hanger. Since the ferrule is cylindrical, forming an arch support, heavy external pressure may be applied in clamping the wires without danger of injury to the insulation about the center conductor 1.

The length of the shank will depend upon the number of bands of clamping devices required to prevent slippage of the supporting wires. To lessen the burden upon the securing means and further enhance the anti-slip qualities of the present clamp, the lip 16 of the ferrule is preferably flared to obtain a snubbing action. While only the supporting wires are illustrated as secured to the ferrule, it should be understood that the conducting wires 4, as well, can be cut and clamped to the exterior of the shank if the added increment of support is deemed desirable.

The installation illustrated in Figure 1 may be used when a tap is to be made in the main cable at one of the poles. This is accomplished by attaching adjacent sections of the main cable and a branch cable to the pole by clamps heretofore discussed. The ends of the center conductors 1 of the adjacent sections of the main cable and 1ª of the branch cable are then spliced or otherwise joined together and the joint is wrapped with suitable insulating tape 21 to maintain the outer conductors at the same potential. The ends of the conducting wires 4 and 4ª of the main and branch cables, respectively, are united by a connector 22 which need not be insulated since the current in the outer conductors is low and usually at ground potential. When the conducting wires are so joined they may separate or branch from their respective cables either before or after the latter have entered the clamps. If the conducting wires are separated from the cable outside the clamp, as shown in Figures 1 and 2, it is preferable to apply a band of wire 23 temporarily to the cable prior to the separation to prevent undue unraveling of the outer conductor.

Where no tap is made, the adjacent sections of the main cable are attached to the pole or support and to each other in the manner shown in Figure 1, except that the branch cable and its clamp are, of course, deleted. The clamp may also be used as a dead end clamp to anchor the end of the cable and as a means for joining the ends of cables between supports.

The description of the clamp has thus far shown that the ferrule is rotatable relative to the hanger, but no attempt has been made to point out the advantages derived from such rotative movement. In view of the importance of this feature of the invention, its advantages are considered worthy of some discussion. In clamps heretofore used for armored electrical cables no provision was made for rotation of the cable relative to the clamp. As a consequence, the permissible swinging of the sections of the cable between supports, under the impetus of wind, has been limited to the play in the means for attaching the clamps to the supports. The resultant snubbing action subjected the armor to shearing stresses at its point of contact with the clamp, eventually causing a break in the armor and either compression of the insulation, with decrease in its effectiveness, or rupture of the cable. By securing the cable to the ferrule, which is freely rotatable relative to the hanger, the wear resulting from the swinging of the cable is impressed upon the ferrule, not the armor, precluding injury to the cable by the clamp. As heretofore stated, the clamp of the present invention possesses the further advantage over previous clamps that the lack of slippage is not dependent solely upon the clamping devices whereby the supporting wires are secured to the shank of the ferrule but is enhanced by the snubbing action obtained by the flaring of the lip of the ferrule.

From the above detailed description of the accompanying drawing it will be apparent that there has been provided a clamp for an armored cable which is simple in construction, easily attachable to the cable, positive in action, and a marked improvement over the art. It should be understood that the illustrated clamps are merely preferred embodiments and that it is intended to include as well all such modifications as do not depart from the spirit of the invention and the scope of the appended claims.

I claim:

1. A clamp for attaching to a support a cable having an insulated center conductor and an outer armor of interlocking alternate hard wires of high tensile strength and relatively soft wires of good electrical conductivity, comprising a yoke pivotally connected to said support and having an apertured base portion, a ferrule extending through and rotatably associated with said base portion, a collar positioned intermediate the ends of said ferrule for limiting its longitudinal movement relative to said yoke in one direction, said ferrule being adapted to receive said armored cable, and means for clamping some of said wires to the exterior of said ferrule intermediate its ends.

2. A clamp for a cable having an insulated center conductor and an outer armor of alternate interlocking supporting and conducting wires, comprising a bolt anchored to a support, a hanger pivotally attached to said bolt, a ferrule rotatably associated with said hanger, said ferrule being of sufficient internal diameter to receive said armored cable, and clamping means spaced inwardly from the ends of said ferrule for securing said supporting wires to its exterior.

3. A support attachment for a cable having an insulated center conductor and an armor surrounding said conductor and formed of alternate interlocking supporting and conducting wires, comprising a bolt anchored to a support, a yoke having a base apertured adjacent its center and a pair of spaced arms extending outwardly from said base, said arms being pivotally connected to said bolt adjacent their outer ends, a tubular member seated in and rotatably associated with said base, said tubular member being adapted to slip over said armored cable, and clamping means for securing said supporting wires to the exterior of said tubular member intermediate its ends, the arms of said yoke being spaced sufficiently to permit rotative movement of said tubular member relative to said yoke after said clamping means have been applied.

4. A supporting device for a cable in which an insulated center conductor is enclosed in a sheathing of bare wire, comprising a hanger, means for pivotally attaching said hanger to a post, a tubular member rotatably associated with said hanger, and means for clamping said sheathing wire to the exterior of said tubular member.

5. In a clamp for a cable having an insulated center conductor and an armor of bare interlocking wires surrounding the insulation, the combination of a T-bolt anchored to a support, a hanger comprising a pair of spaced arms and an apertured wall connecting said arms adjacent their inner ends, said arms being pivotally attached adjacent their outer ends to said bolt on either side of its head, and a ferrule seated in the aperture in said wall and rotatable relative to said hanger, said cable being adapted to extend through said ferrule and be secured to the exterior thereof through its armor.

6. A clamp for a cable having an insulated center conductor and a surrounding conductor formed of supporting and conducting wires, comprising a T-headed bolt anchored to a post, a hanger having an apertured connecting wall and a pair of spaced arms extending outwardly from said wall, said arms being pivotally attached adjacent their outer ends to said bolt on opposite sides of its head, a tubular member received in said aperture and rotatably associated with said hanger, means for limiting the longitudinal movement of said tubular member relative to said hanger in one direction, said cable being adapted to extend through said tubular member, and means for securing said supporting wires to the exterior of said tubular member.

7. A clamp for cables of the type having a center conductor enclosed in insulating material and an outer bare conductor of alternate wires of high tensile strength and wires of good electrical conductivity, interlocked about said insulation to form a compact annulus, comprising a hanger having an apertured connecting wall and a pair of spaced arms extending outwardly from said wall, means for pivotally attaching said arms to a support adjacent their outer ends, a ferrule seated in said apertured wall, said cable being adapted to extend through said ferrule, and means for securing the wires of high tensile strength to the exterior surface of said ferrule for supporting said cable, the arms of said hanger being spaced sufficiently to permit rotation of said ferrule and securing means relative to said hanger.

8. A cable clamp for a cable having an insulated center conductor and a surrounding sheathing of bare wires, comprising an anchor member attached to a support, a yoke pivotally connected to said anchor member and having an apertured base portion, a ferrule rotatably seated in said aperture and having a flared inner lip, some of said sheathing wires being separated from said cable after passing through said ferrule and doubled back over said flared lip, and means for attaching said separated wires to the exterior of said ferrule inwardly of said lip.

CHARLES W. ROBERTS.